United States Patent [19]

Okano

[11] Patent Number: 4,512,005
[45] Date of Patent: Apr. 16, 1985

[54] INFORMATION REPRODUCING APPARATUS IN A RECORDING DISC PLAYER

[75] Inventor: Takashi Okano, Tokorozawa, Japan

[73] Assignee: Universal Pioneer Corporation, Tokyo, Japan

[21] Appl. No.: 340,493

[22] Filed: Jan. 18, 1982

[30] Foreign Application Priority Data

Jan. 19, 1981 [JP] Japan ............................ 56-6906

[51] Int. Cl.$^3$ ............................................ A04N 5/91
[52] U.S. Cl. ................................. 369/48; 369/124; 360/65; 358/340
[58] Field of Search .................. 360/65; 369/47, 48, 369/60, 124, 111; 333/18; 358/342, 328, 340, 343, 166, 167

[56] References Cited

U.S. PATENT DOCUMENTS

| 3,906,152 | 9/1975 | Hoogendijk | 369/124 |
| 4,165,495 | 8/1979 | Takahashi | 360/65 |
| 4,340,950 | 7/1982 | Kosaka | 360/65 |
| 4,370,679 | 1/1983 | Ceshkowsky | 360/65 |

Primary Examiner—Alan Faber
Attorney, Agent, or Firm—Fleit, Jacobson, Cohn & Price

[57] ABSTRACT

An information reproducing apparatus for reading and reproducing an angular-modulated information carrier signal which is recorded together with another information carrier signal on a rotating recording disc in a multiplex form comprises pickup means provided in the vicinity of the rotating recording disc for reading the recorded information carrier signals, and demodulating means for demodulating at least the read and angular-modulated information carrier signal. The information reproducing apparatus is further provided with equalizer means between the pickup means and the demodulating means so as to compensate for the frequency characteristics of the pickup means in response to a control signal, and a control signal producing means for producing the control signal representative of the intensity of the extraneous components contained in the angular-modulated information carrier signal which is read by the pickup means.

3 Claims, 14 Drawing Figures

DIFFERENCE LEVEL BETWEEN SIDEBANDS

INFORMATION REPRODUCING APPARATUS IN A RECORDING DISC PLAYER

FIELD OF THE INVENTION

The present invention relates in general to a recording disc player and, in particular, to an information reproducing apparatus incorporated in the recording disc player, which apparatus reads and reproduces an angular-modulated information carrier signal recorded together with another information carrier signal on the recording disc in a multiplex form.

BACKGROUND OF THE INVENTION

When video information and audio information are simultaneously recorded on a recording disc, such as a video disc, in a multiplex form, a video information carrier signal having a frequency $f_v$ is, for example, angular-modulated (phase- or frequency-modulated) by the video information and an audio information carrier signal having a frequency $f_A$ is modulated in a desired modulation manner. Both of the modulated video and audio information carrier signals are superposed on each other thereby to produce a high frequency signal carrying thereon both the video and audio information which is called a RF signal. The RF signal is optically, electrostatically or otherwise recorded on the recording disc in the form of one or more tangential tracks.

In order to read and reproduce the recorded video and audio information on the recording disc, a recording disc player is used in which the recording disc is rotated at a desired rotational speed. A pickup unit is provided in the vicinity of the rotating recording disc, which optically, electrostatically or otherwise reads the recorded signal from the recording disc and produces the RF signal containing the video and audio information carrier signals. The read RF signal is separated into the original video information carrier signal and the audio information carrier signal by means of, for example, filter means. the filter means are constituted by two band pass filters respectively having central frequencies of $f_V$ and $f_A$.

As is well known in the art, when the RF signal is read from a rotating recording disc, the RF signal contains beat frequency signals respectively having beat frequencies of $f_V-f_A$ and $f_V+f_A$ due to beating phenomenon. The beat frequency signals reside within both side bands of the video information carrier signal so that the filter means cannot usually separate the video information carrier signal and the beat frequencies. As long as the frequency characteristics in amplitude of the pickup means is flat with respect to the frequencies of the input signals thereof, there is no problem.

However, if the frequency characteristics in amplitude of the pickup means degrades across the video information carrier frequency/$f_V$, the RF signal thereby produced contains spurious components which the demodulator cannot delete from the video information signal.

Being well known in the art, the pickup means is usually subjected to modulation in transfer function (MTF) with respect to space frequency which causes degradation in the frequency characteristics of the pickup means within a higher frequency region, whereby the generation of the spurious or extraneous components due to beat frequency components is unavoidable in the prior art information reproducing apparatus.

It is accordingly a primary object to provide a new and improved information reproducing apparatus for reading and reproducing an angular-modulated information carrier signal which is recorded together with another information carrier signal in a multiplex form on a rotating recording disc, which apparatus is free from the unwanted generation of the spurious components in the RF signal obtained from the recording disc.

SUMMARY OF THE INVENTION

In accordance with the present invention, an information recording apparatus includes a pickup means for reading the angular-modulated information carrier signal, and a demodulating means for demodulating the read angular-modulated information carrier signal. An equalizer means is inserted between the pickup means and the demodulating means, and that means compensates for the frequency characteristics of the pickup means in response to a control signal. A control signal producing means produces a control signal representative of the intensity of the extraneous components contained in the read angular-modulated information carrier signal.

BRIEF DESCRIPTION OF THE DRAWINGS

The features and advantages of an information reproducing apparatus according to the present invention will be more clearly understood from the following description taken in conjunction with the accompanying drawings, in which.

DESCRIPTION OF THE PRIOR ART

Figure 1:
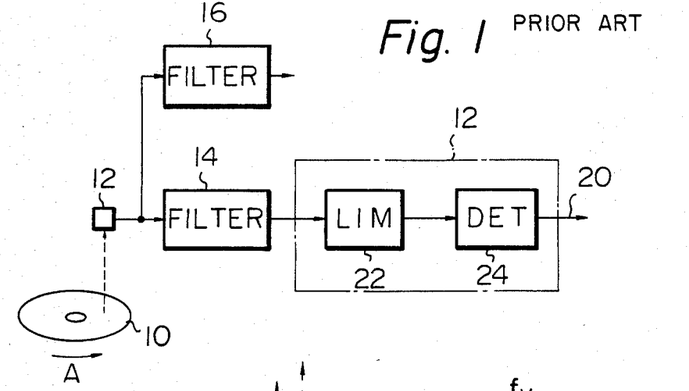
FIG. 1 is a block diagram showing a prior art information reproducing apparatus.

Referring now to the drawings, especially to FIG. 1, a prior art information reproducing apparatus incorporated in a recording disc player is illustrated, in which a recording disc 10 is driven by a suitable turn-table (not shown) to rotate at a desired rotational velocity, for example, a constant angular velocity (CAV) or a constant linear velocity (CLV) in a direction shown by an arrow A. On the recording disc 10 an RF signal is recorded containing two different first and second, information carrier signals multiplexed together and respectively carrying thereon two different pieces of information such as video and audio information in the form of one or more tangential tracks. At least one of the two information carrier signals is angular-modulated and the other may be modulated in angular or otherwise. A pickup unit 12 is placed in the vicinity of the rotating recording disc 10, which pickup unit has a detecting point or spot to be aligned onto a target track from which the recorded RF signal is read. In case the RF signal is recorded in the form of a train of pits to be read optically, the detecting spot of the pickup unit 12 is a light spot. The RF signal produced from the pickup unit 12 is separated by two filters 14 and 16 into the first and second information carrier signals. The first carrier information signal passes through the filter 14 and the second information carrier signal passes through the filter 16. The second information carrier signal passed through the filter 16 is delivered to a suitable demodulating circuit (not shown). The first information carrier signal passed through the filter 14 is angular-modulated and is applied to a demodulating circuit 18 which produces a modulating information signal such as a video information signal on its output terminal 20. The demodulating circuit 18 is usually comprised of a limitter 22 and a phase detector 24. The modulating information signal produced from the demodulating circuit 18 is applied to a suitable transducing means (not shown) such as a video displayer or a speaker system.

Figure 2:
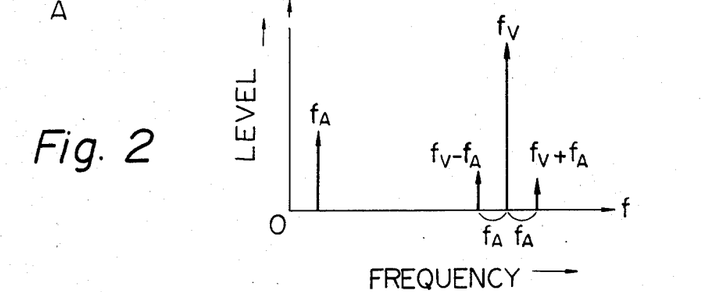
FIG. 2 is a graph showing the frequency spectrum of the RF signal obtained from the rotating recording disc.

In FIG. 2, there is shown a frequency spectrum of the RF signal produced from the pickup unit 12, in which the read angular-modulated first information carrier signal has a central frequency of $f_V$ and the second information carrier signal has a central frequency $f_A$. As seen from this figure, beat frequency signals with frequencies of $f_V-f_A$ and $f_V+f_A$ appear within both side bands of the central frequency $f_V$. It is further apparent that the lower side band signal $f_V-f_A$ has a larger level than the upper side band signal $f_V+f_A$. The frequency characteristics of the pickup unit 12 degrades across the central frequency $f_V$ towards the higher frequency to produce the phenomenon noted in FIG. 2.

Figure 3A:
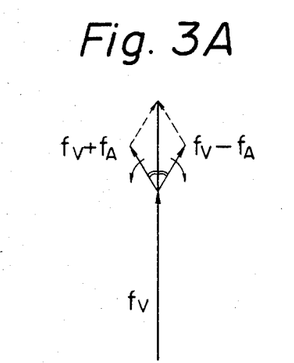
FIGS. 3A and 3B are diagrams respectively showing the vector relationship between the angular-modulated information carrier signal and the beat frequency components.
Figure 3B:
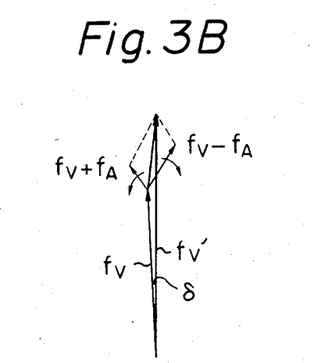

FIGS. 3A and 3B show the relationships between the central frequency signal $f_V$ and beat frequency signals $f_V-f_A$ and $f_V+f_A$ in vector form. FIG. 3A shows the beat frequency signals having similar levels but FIG. 3B shows them having different levels. In the case of FIG. 3A, the composite signal of these three frequency signal components $f_V$, $f_V-f_A$ and $f_V+f_A$ has the same phase as the central frequency $f_V$. However, as mentioned above, the beat frequency signals $f_V-f_A$ and $f_V+f_A$ have different levels and these signals can be shown as two different vectors rotating in opposite directions at the same speed with respect to the vector representing the carrier signal component $f_V$, so that the composite signal $f'_V$ has a different phase from the carrier signal component $f_V$ by a phase difference $\delta$ as shown in FIG. 3B. It is to be understood that the phase difference $\delta$ varies at the same frequency as the frequency $f_A$.

The signal passing through the filter 14 contains the three components $f_V$, $f_V-f_A$ and $f_V+f_A$ and can be represented by the composite frequency signal $f'_V$. When the beat frequency signals $f_V-f_A$ and $f_V+f_A$ have the same levels as shown in FIG. 3A, the composite signal has the same frequency $f_V$ as the angular modulated information carrier signal and varies only in amplitude. The variation in amplitude of the angular modulated information carrier signal can be eliminated by the limitter 22 and no problem arises. However, when the levels of the beat frequencies are different from each other as shown in FIG. 3B, the composite signal has the frequency $f_V'$ different from the frequency $f_V$ and has the variable phase difference with respect to the original information carrier signal. The particular phase difference cannot be eliminated by the limitter 22 and therefore causes spurious components within the modulating information signal.

The above-mentioned problem encountered in the prior art information reproducing apparatus can be solved by an information reproducing apparatus according to the present invention described hereinbelow.

DESCRIPTION OF PREFERRED EMBODIMENTS

Figure 4:
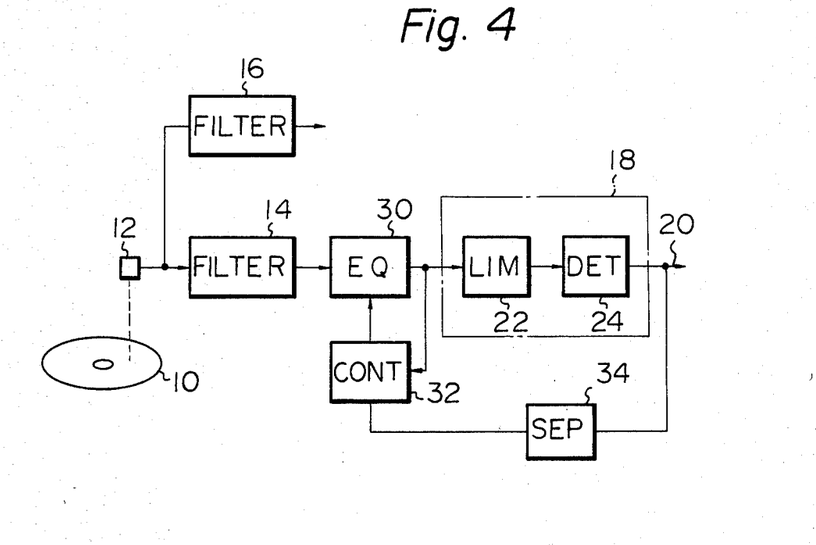
FIG. 4 is a block diagram showing a preferred embodiment of the present invention.

Referring to FIG. 4, there is shown an information reproducing apparatus according to the present invention, which is similar to the prior art information reproducing apparatus shown in FIG. 1 except that it further comprises an equalizer circuit 30 between the filter 14 and the demodulating circuit 18, and a control circuit 32 connected to a control terminal of the equalizer circuit 30, for regulating the frequency characteristics of the equalizer 30 so as to make the beat frequency signals contained in the first information carrier signal have similar levels with respect to each other. In other words, the equalizer circuit 30 compensates the frequency characteristics of the pickup means 12 in accordance with a control signal from the control circuit 32.

The control circuit 32 produces the control signal which is representative of the magnitude of the spurious components contained in the information carrier signal passed through the filter 14, while being triggered by a synchronous pulses from a separator 34. The separator 34 separates the synchronous pulse signal such as a vertical blanking pulse signal and a horizontal synchronous pulse signal from the demodulated information signal.

Figure 5:
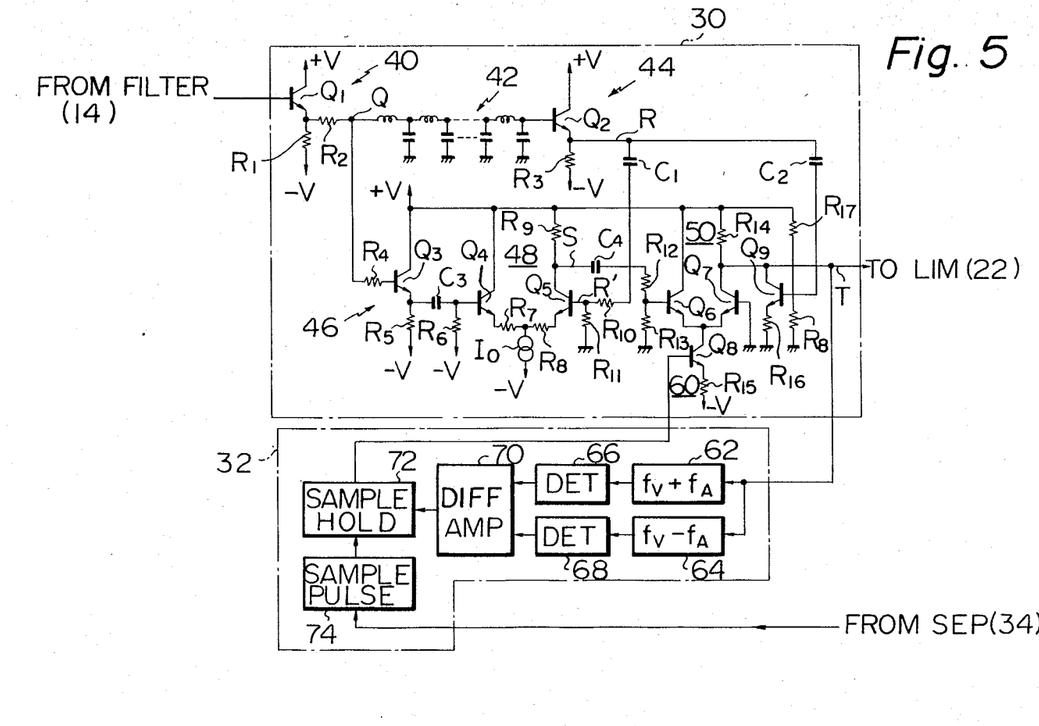
FIG. 5 is a circuit diagram showing preferred circuit arrangements of novel elements in the circuit of FIG. 4.

FIG. 5 illustrates circuit arrangements for the equalizer circuit 30 and the control circuit 32. The equalizer circuit 30 includes an input buffer amplifier 40 constituted by a transistor $Q_1$ and resistors $R_1$ and $R_2$. An output signal from the buffer amplifier 40 is delivered through a delay line 42 to a buffer amplifier 44 which is constituted by a transistor $Q_2$ and a resistor $R_3$. The output signal of the buffer amplifier 40 is mixed with an echo signal produced from the delay line 42 and a signal stands at the output terminal Q of the buffer amplifier 40. The signal at the output terminal Q is applied through a resistor $R_4$ to a buffer amplifier 46 constituted by a transistor $Q_3$ and a resistor $R_5$. An output signal from the buffer amplifier 46 is supplied to one input terminal of a differential amplifier 48 constituted by two transistors $Q_4$ and $Q_5$, resistors $R_7$, $R_8$ and $R_9$, and a current source $I_0$. To the other input terminal of the differential amplifier 48 is applied a signal at an output terminal R of the buffer amplifier 44 by way of a capacitor $C_1$ and a divider circuit of resistors $R_9$ and $R_{10}$.

An output signal of the differential amplifier 48 appears at the collector of the transistor $Q_5$ and is applied by way of a capacitor $C_4$ and a divider circuit of resistors $R_{12}$ and $R_{13}$ to one input terminal of a differential amplifier consisting of transistors $Q_6$ and $Q_7$. The other input terminal of the differential amplifier 50 is grounded. The emitters of the transistors $Q_6$ and $Q_7$ are connected to a negative source $-V$ by way of a transistor $Q_8$ and a resistor $R_{15}$ which constitute a current source 60. The current passing through the current source 60 is controlled in accordance with the control signal from the control circuit 32. The output signal from the buffer amplifier 44 appearing at the output terminal R is applied through a capacitor $C_2$ to the collector of a transistor $Q_9$ and is superposed on an output signal from the differential amplifier 50 thereby to appear at an output terminal T. The signal at the output terminal T is applied to the limiter 22 of the demodulating circuit 18.

The control circuit 32 includes a pair of band pass filters 62 and 64 respectively passing therethrough beat signal components $f_V+f_A$ and $f_V-f_A$ contained in the output signal from the equalizer circuit 32. The beat signal components are detected in amplitude by detectors 66 and 68 and the resulting signals are supplied to both input terminals of a differential amplifier 70 which produces a difference signal representative of the difference in amplitude of the detected side band signals $f_V+f_A$ and $f_V-f_A$. The difference signal is supplied to a sample-hold circuit 72 which samples the difference signal in synchronism with a sampling pulse signal from a sampling pulse generator 74. The sampling pulse generator 74 produces the sampling pulses in synchronism with the synchronous pulses from the seperator 34. The sampled and held difference signal from the sample-hold circuit 72 is applied to the base of the transistor $Q_8$ as the control signal.

The frequency characteristics of the above-mentioned equalizer circuit 30 and the control circuit 32 will be explained hereinbelow while referring to FIGS. 6A through 6C.

Figure 6A:
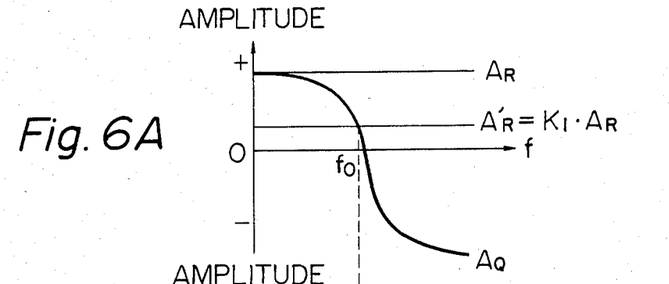
FIGS. 6A, 6B and 6C are graphs respectively showing frequency characteristics of various points in the circuit arrangements shown in FIG. 5.

When, for example, a sine wave signal is applied to the input buffer amplifier 40, the sine wave signal is merely delayed by the delay line 42 and the delayed sine wave signal appearing at the output terminal R has a constant amplitude even if the frequency of the input sine wave signal is as shown by a curve $A_R$ in FIG. 6A. On the other hand, the amplitude of the signal at the output terminal Q decreases as the frequency of the input sine wave signal increases and is inverted by 180° when the frequency of the input sine wave signal exceeds a frequency determined by the characteristics of the delay line 42, as shown by a curve $A_Q$ in FIG. 6A. A line $A_R'$ in FIG. 6A represents an amplitude level of a signal at a termanal R', that is, at the base of the transistor $Q_5$ since $A_R'=K_1 \cdot A_R$ while $K_1$ is a dividing ratio of the voltage divider made of the resistors $R_{10}$ and $R_{11}$. Therefore, the differential amplifier 48 produces at its output terminal S a signal having a frequency characteristic shown by a curve $A_S$ in FIG. 6B which represents differences between signals shown by the curve $A_Q$ and the line $A_R'$. The signal represented by the curve $A_S$ is supplied to one input terminal of the differential amplifier 50. To the other input terminal of the differential amplifier 50 is applied a signal represented by $K_2 \cdot A_S$ where $K_2$ is a dividing ratio of the voltage divider comprised of the resistors $R_{12}$ and $R_{13}$. The signal represented by $K_2' A_S$ is amplified by a variable gain $A_V$ of the differential amplifier 50 and subtracted by the signal $A_R$ by means of the transistor $Q_9$ so that a signal represented by $A_V \cdot K_2 \cdot A_S - A_R$ appears at the output terminal T. The variable gain $A_V$ varies in accordance with variation of the current passing through the current source 60 which is in turn controlled by the control signal from the control circuit 32. Therefore, the signal at the output terminal T can be represented by areas indicated by hatchings in FIG. 6C.

Figure 6B:
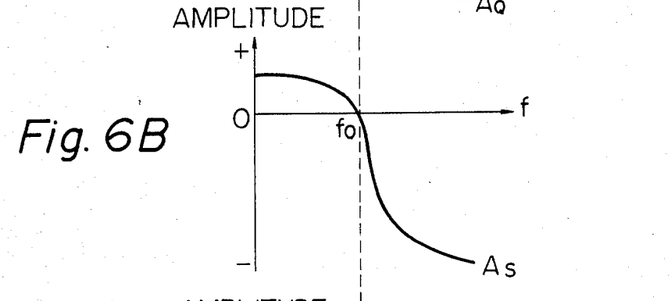
Figure 6C:
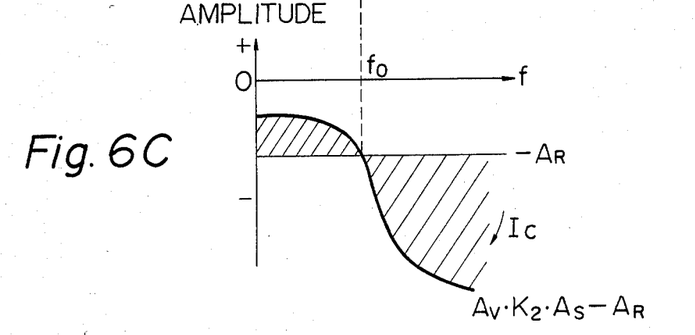

When, in this instance, a zero cross point of the curve $A_S$ in FIG. 6B is indicated by a frequency $f_o$, the characteristic of the delay line 42 is selected such that the frequency $f_o$ is equal to the frequency $f_V$ of the first information carrier signal which is angularly modulated. The control signal from the control circuit 32 changes the gain of the differential amplifier 50 so that the amplitudes of the beat signal components $f_V+f_A$ and $f_V-f_A$ are balanced or equal to each other and coincide in intensity whereby the generation of the spurious components in the demodulated information signal can be suppressed or avoided effectively.

It is to be understand that the above-mentioned equalizer circuit 30 has a uniform group delay characteristics for the input signal and has an amplitude versus frequency characteristic which is controllable by the control signal, and the output signal from the equalizer circuit 30 is subjected to only amplitude modulation but not to frequency modulation. Thus, the equalizer circuit 30 does not cause any unwanted degradation or distortion in the signal passing therethrough.

Figure 7:
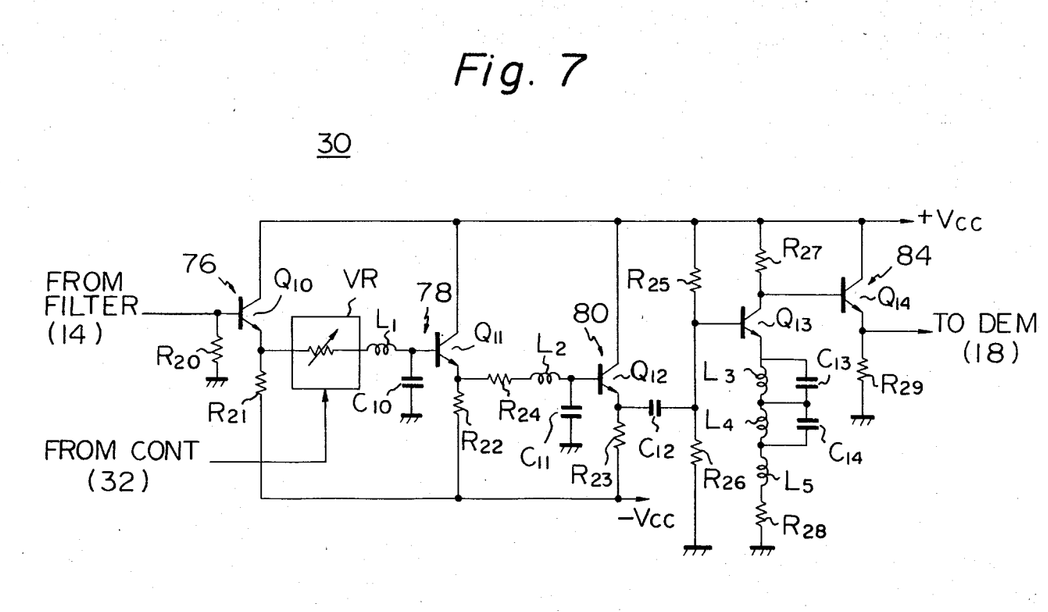
FIG. 7 is a circuit diagram showing another preferred circuit arrangement of a part of the circuit of FIG. 4.

FIG. 7 illustrates another circuit arrangement of the equalizer circuit 30, in which the angular-modulated first carrier signal from the filter 14 is applied to an input buffer amplifier 76 constituted by a transistor $Q_{10}$ and resistors $R_{20}$ and $R_{21}$. The signal passed through the buffer amplifier 76 is supplied through a variable resistor VR to a first resonance circuit 78 constituted by an inductor $L_1$, a capacitor $C_{10}$, a resistor $R_{22}$ and a transistor $Q_{11}$. The resistance of the variable resistor VR is controlled by the control signal from the control circuit 32. The signal passed through the first resonance circuit 78 is further supplied through a resistor $R_{24}$ to a second resonance circuit 80 constituted by an inductor $L_2$, a capacitor $C_{11}$, a transistor $Q_{12}$ and a resistor $R_{23}$. The signal passed through the second resonance circuit 80 is delivered through a coupling capacitor $C_{12}$ to a trap circuit 82 which is constituted by resistors $R_{25}$, $R_{26}$, $R_{27}$, $R_{28}$, a transistor $Q_{13}$, inductors $L_3$, $L_4$ and capacitors $C_{13}$, $C_{14}$. The trap circuit 82 acts as a notch filter for eliminating only the second information carrier signal $f_A$ which is multiplexed with the first information carrier signal $f_V$. The trap circuit 82 can be omitted if the filter 14 can completely block the information carrier signal $f_A$ from passing therethrough. The signal passed through the trap circuit 82 is delivered to the demodulating circuit 18 by way of a buffer amplifier 84 made of an emitter follower circuit of a transistor $Q_{14}$ and a resistor $R_{29}$.

Figure 8:
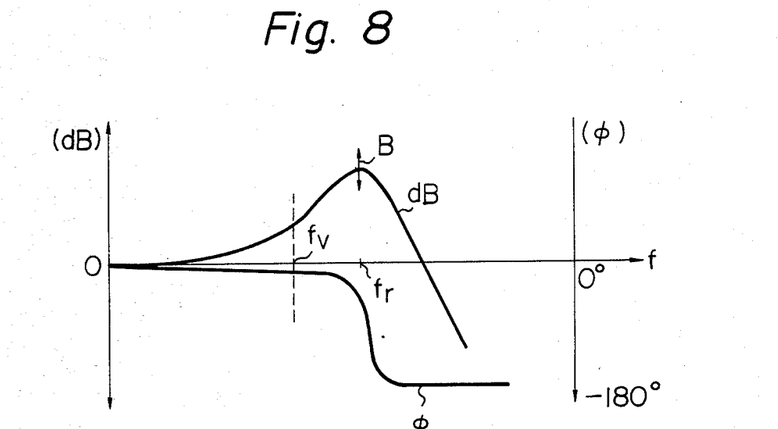
FIG. 8 is a graph showing frequency characteristics of the circuit arrangement of FIG. 7.

FIG. 8 illustrates frequency characteristics in gain and in phase of the equalizer circuit 30 of FIG. 7 by curves dB and $\phi$. As seen from the curve dB, the gain of the equalizer circuit 30 of FIG. 7 takes a peak value at a resonance frequency $f_r$ and the peak value varies in accordance with the variation in resistance of the variable resistor VR as shown by arrows B. As seen from the curve $\phi$, the phase characteristic is generally constant within a region below the resonance frequency $f_r$ and phase inversion takes place around the resonance frequency $f_r$. The circuit arrangement of FIG. 7 is so designed that the frequency $f_V$ of the angular-modulated first information carrier signal resides within the region below the resonance frequency $f_r$ as shown in FIG. 8.

Accordingly, the equalizer circuit 30 of FIG. 7 can eliminate the difference in levels between the beat frequency components within the both side bands of the angular-modulated first information carrier signal.

Figure 9:
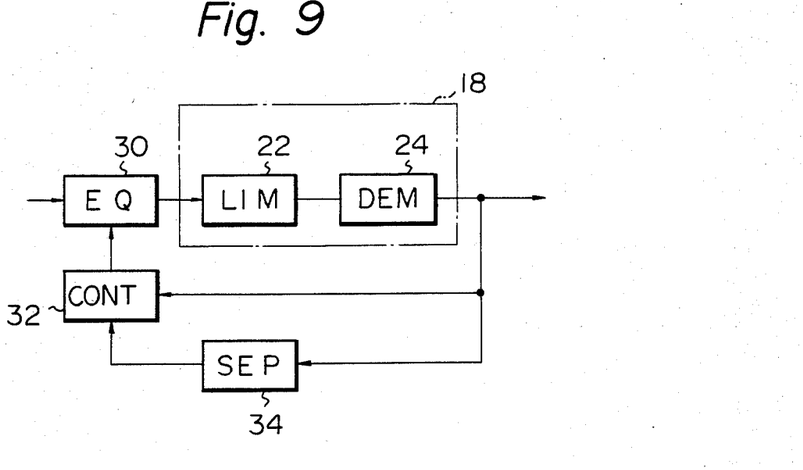
FIG. 9 is a block diagram showing another embodiment of the present invention.

FIG. 9 illustrates another embodiment of the present invention which is identically the same as the embodiment of FIG. 4 except that the control circuit 32 produces the control signal on the basis of the demodulated signal from the demodulating circuit 18 and the synchronous signal separated from the demodulated signal. Namely, the control signal produced from the control circuit 32 is representative of the magnitude of the spurious components contained in the demodulated signal generated due to the difference in levels between the side band components of the angular-modulated first information carrier signal.

Figure 10:
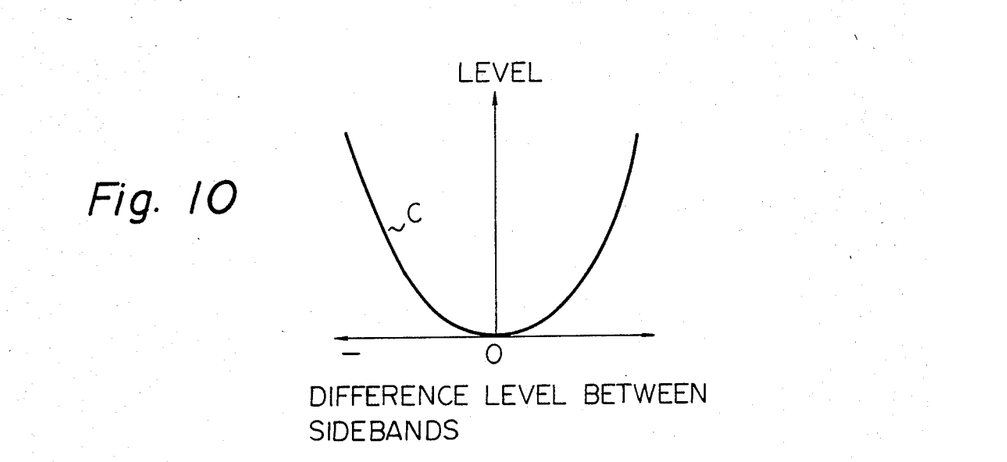
FIG. 10 is a graph showing the level of the spurious components contained in the demodulated signal in terms of the difference in level between the both side band components of the angular-modulated information carrier signal.

In FIG. 10, a curve C illustrates the relationship between the difference levels between the side band components of the angular-modulated first information carrier signal passed through the filter 14 and the level or magnitude of the spurious components contained in the demodulated signal produced from the demodulating circuit 18. Since, as seen from the curve C, the illustrated relation is non-linear, it is not easy to design a control circuit to produce a control signal which varies with a specific function such as an inverse function of the non-linear function illustrated by the curve B.

Figure 11:
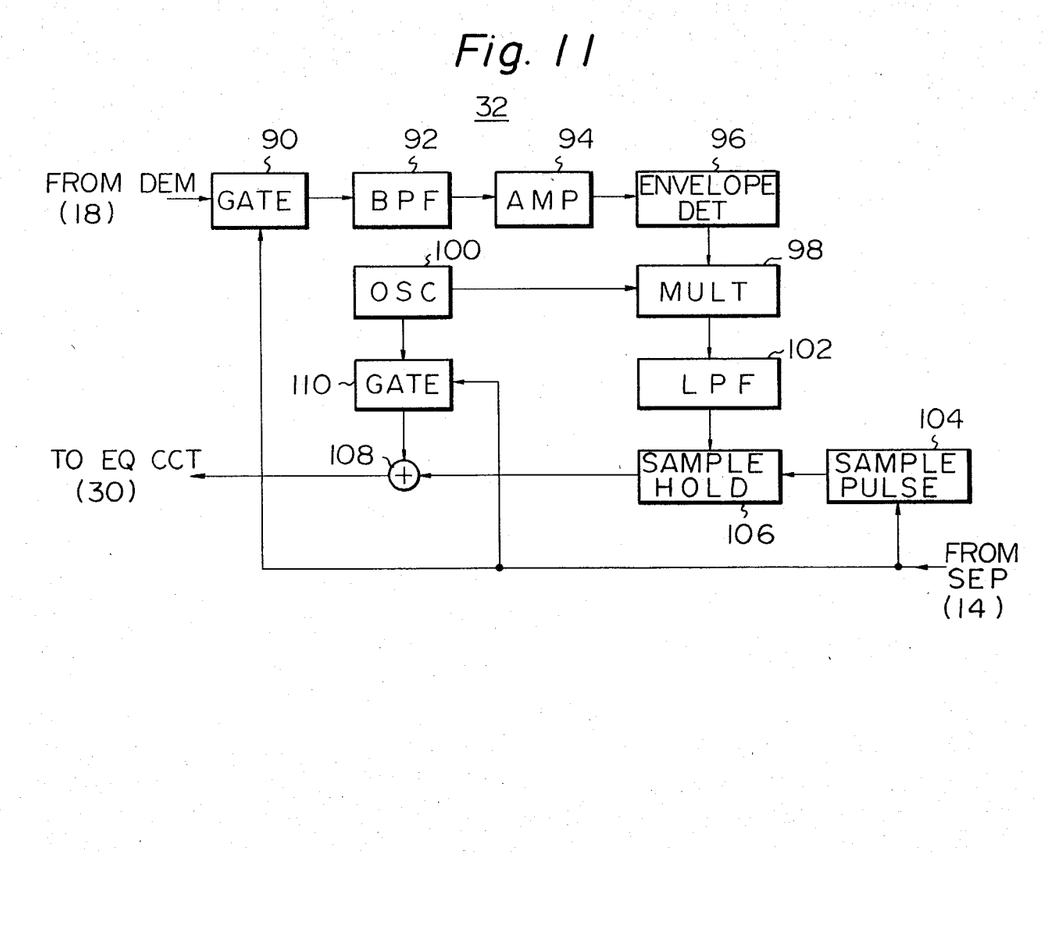
FIG. 11 is a circuit diagram showing a circuit arrangement of a part of the embodiment shown in FIG. 9.

FIG. 11 illustrates a preferred circuit arrangement of the control circuit 32 to be used in the embodiment of FIG. 9. This control circuit 32 includes a gate 90 which passes therethrough the demodulated signal delivered from the demodulating circuit 18 when it is triggered by the synchronous pulse. In case the demodulated signal is a video signal, the synchronous pulse may be the vertical blanking pulse. Only the spurious component contained in the blanking period of the demodulated signal can pass a narrow band pass filter 92. Since the spurious component has the same frequency as the second information carrier signal, the central frequency of the band pass filter 92 is equal to that of the second information carrier signal. The spurious component passed through the band pass filter 92 is supplied through an amplifier 94 to an envelope detector 96. The signal from the envelope detector 95 is supplied to one input terminal of a multiplier 98 which multiplies the signal supplied to the input terminal with a reference signal supplied to the other input terminal thereof from an oscillator 100. The frequency of the reference signal from the oscillator 100 is lower than that of the second information carrier frequency. The multiplied signals are delivered to a low pass filter 102. The multiplier 98 and the low pass filter 102 cooperate with each other to act as a detector which produces an error signal representative of the phase and level differences between the two input signals to the multiplier 98. A sample pulse generator 104 produces a sample pulse signal which is supplied to a sample-hold circuit 106. The sample and held error signal from the sample-hold circuit 106 is supplied to one input terminal of an adder 108. A gate circuit 110 is triggered by the synchronous pulse and passes therethrough the reference signal to the other input terminal of the adder 108. A signal obtained from the adder 108 is supplied to the equalizer circuit 30 as the control signal.

It is to be noted that the frequency of the reference signal should be selected such that it is possible to make a phase comparison during the sampling period. Thus, the frequency of the reference frequency may be about 100 KHz in the case of the video carrier signal.

It is to be understood that the invention is not to be limited to the exact construction shown and described herein and that various changes and modifications may be made without departing from the spirit and scope of the invention, as defined in the appended claims.

What is claimed is:

1. An information reproducing apparatus for reading and reproducing a first information carrier signal which is angular-modulated and is recorded together with a second information carrier signal on a rotatable recording disc in a frequency multiplex form, which comprises:
   a pick-up means for reading said first and second information carrier signals from said recording disc;
   a filter means for separating the read first and second information carrier signals from each other;
   a demodulating means for demodulating at least said read first information carrier signal;
   an equalizer means inserted between said filter means and said demodulating means, for passing therethrough said first information carrier signal and for compensating for the frequency characteristics of said pick-up means, said equalizer means having a frequency-to-gain characteristic controlled by a control signal; and
   a control signal producing means for producing said control signal in response to the output signal from said equalizer means, said control signal being representative of the intensity of the extraneous components appearing in the output signal from said equalizer means, thereby to make the upper and lower side band frequencies of said first information carrier signal coincide in intensity with each other so as to compensate the degraded frequency response of said pick-up means.

2. An information reproducing apparatus as set forth in claim 1, in which said equalizer means includes:
   a buffer amplifier for amplifying said first information carrier signal;
   delay means for applying a predetermined delay to the amplifier signal from the buffer amplifier;
   first subtraction means for subtracting the delayed signal from the amplified signal;
   a second subtraction means for subtracting the delayed signal from the output signal from the first subtraction means; and
   gain control means for controlling the gain of said second subtraction means in accordance with said control signal.

3. An information reproducing apparatus as set forth in claim 1, in which said control signal producing means includes:
   spurious component separating means for separating the spurious components respectively being produced due to beating between said first and second information carrier signals and appearing within the side bands of the central frequency of said first information carrier signal; and
   comparing means for comparing the magnitude of the spurious components appearing within one of said side bands with that of the spurious components appearing within the other side band and for producing said control signal representative of difference between those magnitudes for the respective spurious components.

* * * * *